United States Patent
Maguire

(10) Patent No.: US 9,637,283 B2
(45) Date of Patent: May 2, 2017

(54) QUARTER TURN ADAPTER CONNECTIVE OUTLET FITTING FOR LIQUID COLOR DISPENSING

(71) Applicant: Stephen B. Maguire, West Chester, PA (US)

(72) Inventor: Stephen B. Maguire, West Chester, PA (US)

(*) Notice: Subject to any disclaimer, the term of this patent is extended or adjusted under 35 U.S.C. 154(b) by 0 days.

(21) Appl. No.: 14/617,035

(22) Filed: Feb. 9, 2015

(65) Prior Publication Data

US 2015/0158638 A1 Jun. 11, 2015

Related U.S. Application Data

(63) Continuation-in-part of application No. 13/913,375, filed on Jun. 7, 2013, now Pat. No. 9,188,118, and a
(Continued)

(51) Int. Cl.
| | | |
|---|---|---|
| B65D 47/24 | (2006.01) |
| F04B 43/02 | (2006.01) |
| F04B 15/02 | (2006.01) |
| F04B 53/10 | (2006.01) |
| F04B 53/16 | (2006.01) |
| F16K 15/04 | (2006.01) |
| F04B 49/06 | (2006.01) |

(52) U.S. Cl.
CPC .............. *B65D 47/24* (2013.01); *F04B 15/02* (2013.01); *F04B 43/02* (2013.01); *F04B 53/10* (2013.01); *F04B 53/16* (2013.01); *F04B 49/06* (2013.01); *F16K 15/044* (2013.01); *Y10T 137/7837* (2015.04)

(58) Field of Classification Search
CPC .... Y10T 137/7927; F16K 15/044; F04B 53/16
USPC ......................................... 137/533, 535, 539
See application file for complete search history.

(56) References Cited

U.S. PATENT DOCUMENTS

| 600,233 A | 3/1898 | Palm |
| 1,451,759 A | 4/1923 | Bruhn |

(Continued)

FOREIGN PATENT DOCUMENTS

| CN | 2809263 Y | 8/2006 |
| DE | 3433693 A1 | 3/1986 |

(Continued)

OTHER PUBLICATIONS

Forty-four page two-sided brochure including cover and back pages entitled "Maguire: Auxiliary equipment for the plastics industry" of Maguire Products, Inc., Oct. 2000.

(Continued)

*Primary Examiner* — Kevin Lee
*Assistant Examiner* — P. Macade Nichols
(74) *Attorney, Agent, or Firm* — Fox Rothschild LLP

(57) ABSTRACT

Apparatus for allowing a quick connection and disconnection of pump components to a liquid color pump. Apparatus includes a male member received with a female member. The female member is formed from three plates layered on top of each other. Preferably, a quarter turn rotation of the male member in relation to the female member results in the securing of the pump component to the liquid color pump.

8 Claims, 5 Drawing Sheets

Related U.S. Application Data continuation-in-part of application No. 14/587,921, filed on Dec. 31, 2014, and a continuation-in-part of application No. 14/168,731, filed on Jan. 30, 2014.

(60) Provisional application No. 61/940,712, filed on Feb. 17, 2014, provisional application No. 61/660,326, filed on Jun. 15, 2012.

(56) References Cited

U.S. PATENT DOCUMENTS

| | | |
|---|---|---|
| 1,482,376 A | 2/1924 | Anderson |
| 1,489,348 A | 4/1924 | Hampton |
| 2,188,646 A | 1/1940 | Bunch |
| 2,199,657 A | 5/1940 | Bunch |
| 2,387,233 A | 10/1945 | Clapp |
| 2,606,696 A | 8/1952 | Miner |
| 2,656,828 A | 10/1953 | Conover |
| 2,665,825 A | 1/1954 | Poitras et al. |
| 2,701,881 A | 2/1955 | McGee |
| 2,873,892 A | 2/1959 | Nelson et al. |
| 2,909,315 A | 10/1959 | Sampietro |
| 2,956,822 A | 10/1960 | Kates |
| 3,391,645 A | 7/1968 | Koza |
| 3,477,698 A | 11/1969 | Smith et al. |
| 3,518,033 A | 6/1970 | Anderson |
| 3,785,412 A | 1/1974 | Stone |
| 3,814,388 A | 6/1974 | Jakob |
| 3,883,275 A | 5/1975 | Browne |
| 3,957,399 A | 5/1976 | Siczek |
| 3,988,088 A | 10/1976 | King et al. |
| 3,998,103 A | 12/1976 | Bjorklund et al. |
| 4,185,948 A | 1/1980 | Maguire |
| 4,469,127 A | 9/1984 | Kitamura |
| 4,473,173 A | 9/1984 | DeGroff et al. |
| 4,501,405 A | 2/1985 | Usry |
| 4,571,416 A | 2/1986 | Jarzombeck et al. |
| 4,586,882 A | 5/1986 | Tseng |
| 4,605,297 A | 8/1986 | Livingston et al. |
| 4,606,710 A | 8/1986 | Maguire |
| 4,621,990 A | 11/1986 | Forsythe et al. |
| 4,657,490 A | 4/1987 | Abbott |
| 4,759,189 A | 7/1988 | Stropkay |
| 4,834,071 A | 5/1989 | Hosoi et al. |
| 4,921,132 A | 5/1990 | Wales |
| 4,967,940 A | 11/1990 | Blette et al. |
| 5,039,279 A | 8/1991 | Natwick et al. |
| 5,116,547 A | 5/1992 | Tsukahara et al. |
| 5,199,852 A | 4/1993 | Danby |
| 5,215,215 A | 6/1993 | Sauer |
| 5,225,210 A | 7/1993 | Shimoda |
| 5,344,232 A | 9/1994 | Nelson et al. |
| 5,364,242 A | 11/1994 | Olsen |
| 5,609,191 A | 3/1997 | Topping |
| 5,622,392 A | 4/1997 | Gochenouer |
| 5,853,244 A | 12/1998 | Hoff et al. |
| 5,953,923 A | 9/1999 | Davies |
| 5,980,490 A | 11/1999 | Tsoukalis |
| 5,984,777 A | 11/1999 | Kuchar |
| 5,988,983 A | 11/1999 | Furusawa |
| 6,007,236 A | 12/1999 | Maguire |
| 6,057,514 A | 5/2000 | Maguire |
| 6,188,936 B1 | 2/2001 | Maguire et al. |
| 6,213,739 B1 | 4/2001 | Phallen et al. |
| 6,386,841 B1 | 5/2002 | Probst |
| 6,402,363 B1 | 6/2002 | Maguire |
| 6,502,013 B1 | 12/2002 | Sosnik |
| 6,523,451 B1 | 2/2003 | Liao |
| 6,599,005 B2 | 7/2003 | van Der Wei |
| 6,669,358 B2 | 12/2003 | Shimoda |
| 6,719,453 B2 | 4/2004 | Cosman et al. |
| 6,880,965 B1 | 4/2005 | Sheffield, Jr. |
| 6,991,004 B2 | 1/2006 | Kaufhold et al. |
| 7,118,349 B2 | 10/2006 | Oglesby |
| 7,154,069 B1 | 12/2006 | Gordon |
| 7,201,290 B2 | 4/2007 | Mehus |
| 7,311,882 B1 | 12/2007 | Renzi |
| 7,390,119 B2 | 6/2008 | Maguire |
| 7,416,096 B2 | 8/2008 | Maguire |
| 7,594,717 B2 | 9/2009 | Sheinman |
| 7,958,915 B2 | 6/2011 | Maguire |
| 7,980,834 B2 | 7/2011 | Maguire |
| 8,042,578 B2 | 10/2011 | Post |
| 8,627,852 B2 * | 1/2014 | Hatton ............... B60P 7/065 137/224 |
| 8,757,217 B2 | 6/2014 | Maguire |
| 8,800,821 B2 | 8/2014 | Maguire et al. |
| 9,188,118 B2 | 11/2015 | Maguire |
| 2002/0023449 A1 | 2/2002 | Park et al. |
| 2002/0031822 A1 | 3/2002 | Van Der Wei et al. |
| 2002/0122103 A1 | 9/2002 | Yamamoto et al. |
| 2002/0189667 A1 | 12/2002 | O'Dougherty et al. |
| 2003/0071868 A1 | 4/2003 | Koshikawa et al. |
| 2003/0142580 A1 | 7/2003 | Maguire |
| 2003/0218014 A1 | 11/2003 | Gregory et al. |
| 2005/0052945 A1 | 3/2005 | Maguire |
| 2005/0126638 A1 * | 6/2005 | Gilbert ............... F16K 15/044 137/539 |
| 2006/0067844 A1 | 3/2006 | Iversen |
| 2007/0071624 A1 | 3/2007 | Brewer |
| 2010/0322644 A1 | 12/2010 | Ajima |
| 2011/0200464 A1 | 8/2011 | Maguire et al. |
| 2012/0195771 A1 | 8/2012 | Brender a Brandis |
| 2012/0260992 A1 | 10/2012 | Maguire |
| 2013/0334258 A1 | 12/2013 | Maguire |
| 2014/0087035 A1 | 3/2014 | Cummings |
| 2014/0147288 A1 | 5/2014 | Maguire |
| 2014/0224830 A1 | 8/2014 | Maguire |
| 2015/0020713 A1 | 1/2015 | Maguire |
| 2015/0066794 A1 | 3/2015 | Maguire et al. |
| 2015/0108748 A1 | 4/2015 | Maguire |
| 2015/0165662 A1 | 6/2015 | Maguire |
| 2016/0040661 A1 | 2/2016 | Maguire |

FOREIGN PATENT DOCUMENTS

| | | |
|---|---|---|
| FR | 1 477 595 A | 4/1967 |
| GB | 1145752 | 3/1969 |
| JP | 3550699 B2 | 8/2004 |
| WO | WO 01/49374 A1 | 7/2001 |
| WO | WO 2015/089499 | 6/2015 |

OTHER PUBLICATIONS

Two-sided color brochure entitled Maguire: Model MPA Liquid Color Pump, Maguire Products, Inc., published Dec. 28, 1995.
International Search Report for PCT/US02/02934, dated Feb. 20, 2003.
Written Opinion for PCT/US02/02934, dated Mar. 24, 2003.
International Search Report for PCT/US11/021994, dated May 24, 2011.
Written Opinion for PCT/US11/021994, dated May 24, 2011.
Thirty-two page catalog entitled "Maguire Color Blending Equipment" published by Maguire Products, Inc., 1993, United States.
International Search Report for PCT/US2014/070264 dated Apr. 15, 2015.
Written Opinion for PCT/US2014/070264 dated Apr. 15, 2015.
International Search Report for PCT/US2014/053391 dated Jan. 29, 2015.
Written Opinion for PCT/US2014/053391 dated Jan. 29, 2015.
Wayback Machine of SMC Linear Actuators Sep. 11, 2011, SMC, Accessed on Apr. 6, 2016.
Wayback Machine of SMC Linear Actuator CO2 Series Catalog, Sep. 11, 2011, SMC, Accessed on Apr. 6, 2016.

* cited by examiner

QUARTER TURN ADAPTER CONNECTIVE OUTLET FITTING FOR LIQUID COLOR DISPENSING

CROSS-REFERENCE TO RELATED PATENT APPLICATION

This patent application is a continuation-in-part of U.S. patent application Ser. No. 13/913,375 filed 7 Jun. 2013 in the name of Stephen B. Maguire and published as US 2013/0334258 A1, the priority of which is claimed under 35 USC 120. The '375 application claims the benefit of the priority under 35 USC 119 and 35 USC 120 of provisional U.S. patent application Ser. No. 61/660,326 filed 15 Jun. 2012 in the name of Stephen B. Maguire and entitled "Molded Diaphragm Pump." This patent application is also a continuation-in-part of U.S. patent application Ser. No. 14/587,921 filed 31 Dec. 2014 in the name of Stephen B. Maguire and entitled "Multiple Plate Quick Disconnect Fitting." The '921 application is a continuation-in-part of the '375 application and claims the benefit of the priority of the '375 application and similarly though that application claims the benefit of the priority of the '326 application.

This patent application is further a continuation-in-part of U.S. patent application Ser. No. 14/168,731 filed 30 Jan. 2014 in the name of Stephen B. Maguire and entitled "Pump Actuator and Method for Pump Operation." The '731 application, published as U.S. 2014/0147288 on 29 May 2014, is a continuation-in-part of the '375 application and claims the benefit of the priority of the '375 application and similarly to the applications mentioned above claims the benefit of the priority of the '326 application. The instant application similarly claims the benefit of the priority of the '326 application through the parent '375, '921, and '731 applications noted above. The disclosures of all of these preceding applications are hereby incorporated by reference in their entireties.

This patent application also claims the benefit of the priority under 35 USC 119 and 35 USC 120 of provisional U.S. patent application Ser. No. 61/940,712 filed 17 Feb. 2014 in the name of Stephen B. Maguire and entitled "Quarter Turn Adapter/Delivery Tube Assembly for Liquid Color." The disclosure of the '712 application is also hereby incorporated by reference in its entirety.

BACKGROUND OF THE INVENTION

Field of the Invention

This invention pertains to the use of liquid color in plastic molding and extrusion. The patent application even more specifically pertains to a quarter turn adapter connector preferably, but not necessarily, utilized with a liquid color pump which may be installed on or form a part of the lid of a liquid color container.

Description of the Prior Art

Pumps for liquid color are known, with one such pump being disclosed in U.S. Pat. No. 7,416,096, with another being disclosed in U.S. Pat. No. 7,980,834, and yet another being disclosed in U.S. Pat. No. 8,800,821. The disclosures of the '096, '834, and '821 patents are incorporated by reference.

The '096 patent discloses a container of liquid color material having a diaphragm liquid color pump located in the container for providing liquid color from the container. The diaphragm liquid color pump is located in the container at the container bottom, where the pump can collect liquid color as the container empties. The pump is driven by a pneumatic piston-cylinder combination located outside the container, with a shaft extending downwardly from the pneumatic piston-cylinder combination to the diaphragm pump, to reciprocate the diaphragm back and forth to effectuate pumping action.

The apparatus disclosed in the '096 patent is relatively low in cost. The apparatus includes a liquid-tight fitting allowing the liquid color output from the pump to be supplied directly to a plastics material processing machine, for the liquid color to impart color directly to plastic parts as they are manufactured.

The apparatus disclosed in the '834 patent provides pressure boosting, permitting liquid color to be injected into an extruder screw or a molding machine screw barrel at a position downstream from the throat, closer to the position at which the finished plastic parts are molded or extruded.

The '821 patent discloses a disposable low-cost pump in a container for liquid color, where the pump is fabricated from a plurality of PVC tubular members connected in a way to provide a pumping chamber. A piston is displaceable into the pumping chamber. A spring biases the piston outwardly from the chamber, in opposition to force applied by an air cylinder.

While these devices have merit and have proved commercially successful, there is a continuing need for lower cost, higher reliability apparatus to provide liquid color from liquid color containers to injection and compression molding machines and to extruders, to color plastic parts in the course of manufacture thereof.

While disposable pumps for liquid color are known in the sense that those pumps can be removed from the liquid color containers and discarded, there is a need for a pump that fits integrally with a liquid color container in a manner to be a part of the container so that the complete assembled pump cannot be removed without compromising the container and leaving an open hole. This is to discourage pump scavenging. There is a further need in practice, which is somewhat inconsistent with the foregoing in practice, for the relatively high cost portions of the pump to be easily and quickly removable once the container has been emptied, so that those high cost portions of the pump may be used with a new, full container of liquid color, while low cost portions of the pump remain with an empty container to prevent flow of any remaining liquid color out of the container, so that these low cost portions of the pump may be used when the container is refilled and the pump is reassembled to pump liquid color from the new container. Many but not all of these needs are satisfied by the apparatus disclosed in the '375 application, of which this application is a continuation-in-part.

SUMMARY OF THE INVENTION

In one of its aspects, this invention provides a quarter turn adapter connective fitting for connecting two liquid color conduits for liquid color flow therebetween. This fitting includes a male portion adapted for connection to a first liquid color conduit, having a tubular interior portion for conveyance therethrough of liquid color, with the tubular portion having an annular exterior. The quarter turn adapter connective outlet fitting further includes a female portion adapted for connection to a second liquid color conduit such as the outlet conduit portion of a liquid color pump. The female member has an arcuate passageway therethrough for slidable engaging receipt of an annular exterior section of the male portion and preferably includes lugs for engaging a quick disconnect fitting that is preferably of the sandwich type.

In another one of its aspects, this invention provides a quarter turn adapter outlet fitting for controlled delivery of liquid color therethrough from a supply. The fitting preferably includes a generally cylindrical outer portion having a pair of outwardly extending arcuate lugs formed on a first end thereof. Lower surfaces of the lugs are preferably co-planar with the first end surface of the outer portion. Outwardly facing surfaces of the lugs preferably are curved and preferably parallel with the curved cylindrical outer surface of the outer portion. The lugs most desirably subtend angles of less than 90°.

The generally cylindrical outer portion preferably further has a first axial passageway extending through the outer portion. The first axial passageway preferably has first and second annular internal shoulders formed therein, located intermediate of the first and second ends of the outer portion. A second shoulder preferably defines an end of a cylindrical central portion of the first axial passageway. The second shoulder is preferably of larger diameter than the first shoulder and is the more proximate to the first end of the outer portion. The first axial passageway preferably has an undercut-shaped annular recess at the first end of the cylindrical outer portion.

The adapter outlet fitting preferably further includes an inner portion having a cylindrical outer surface extending axially length-wise, partway along the length of the inner portion. The inner portion preferably further includes an annular protrusion extending from terminus of the inner portion cylindrical outer surface to define a first end of the inner portion. The annular protrusion desirably is of a greater diameter at juncture with the inner portion cylindrical outer surface and is of lesser diameter remote from juncture with the inner portion cylindrical outer surface. The juncture preferably defines a perpendicular shoulder relative to the inner portion cylindrical outer surface.

The inner portion preferably further includes a second axial passageway extending from the first end towards the second end of the inner portion, with the second axial passageway preferably having a lateral opening of lesser diameter in the annular protrusion proximate the first end of the inner portion. The second axial passageway has a preferably conical surface between the first end and a second end thereof to define a valve seat.

The adapter fitting preferably further includes a first o-ring within the inner portion, positioned at juncture of a minimum diameter part of the conical surface and a tubular part of the second axial passageway. The adapter outlet fitting further includes a ball preferably residing on the conical surface and contacting the first o-ring and a spring preferably between the ball and the first annular internal shoulder, for biasing the ball against the first o-ring.

The cylindrical outer surface of the inner portion is preferably in facing complemental contact with the cylindrical central portion of the first axial passageway. A first end of the inner portion preferably abuts the second shoulder of the first axial passageway. The undercut shaped annular recess in the outer portion and the perpendicular shoulder of the annular protrusion of the inner portion preferably form an inset pocket at the first end of the fitting. This pocket preferably receives a second o-ring for sealing the fitting against the supply. The first and second axial passageways are preferably coaxial and communicate one with another.

DESCRIPTION OF THE PREFERRED EMBODIMENTS AND BEST MODE KNOWN FOR PRACTICE OF THE INVENTION

Figure 7:
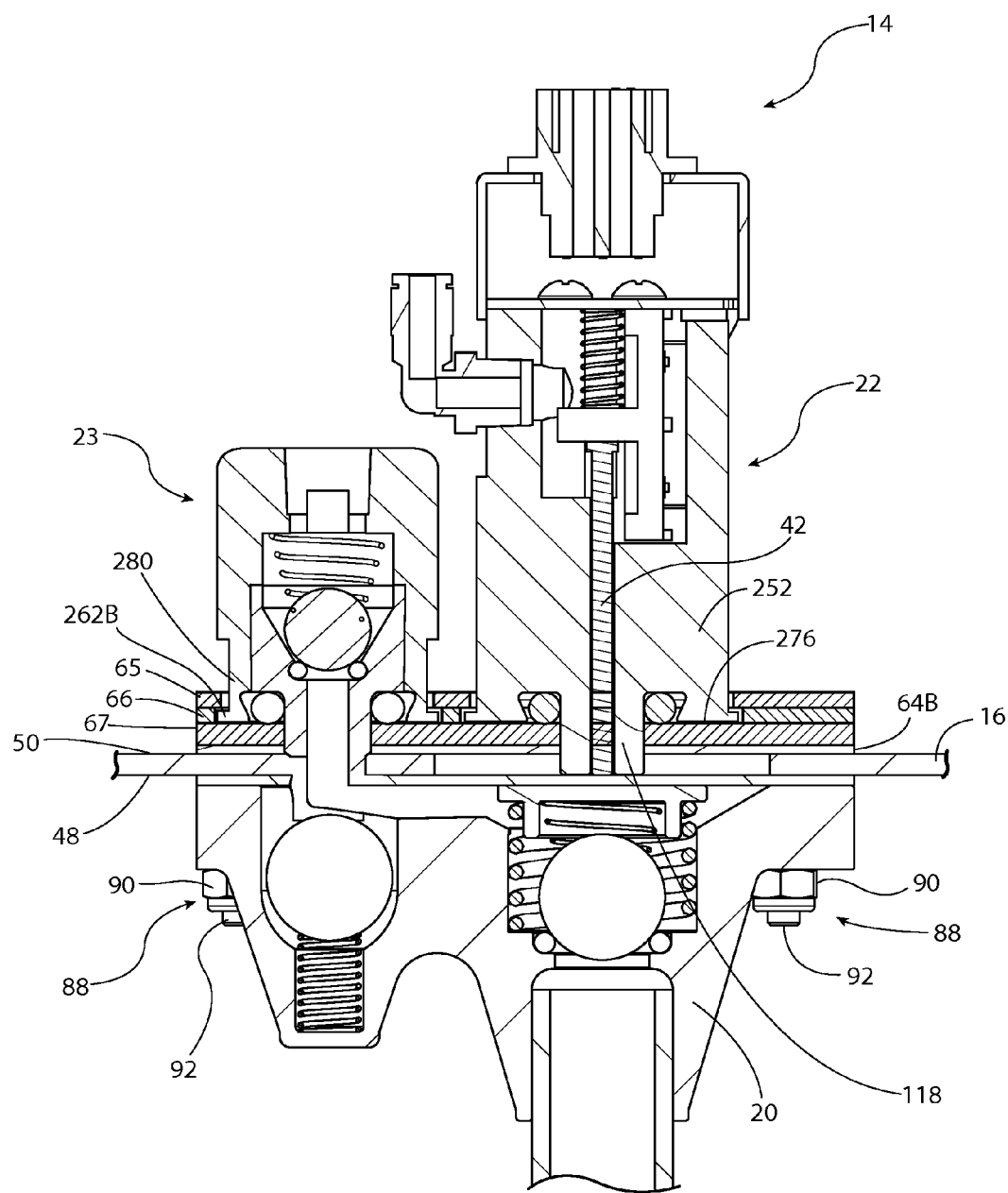
FIG. 7 is a sectional view of a molded liquid color pump of the type disclosed in co-pending application Ser. No. 13/913,375, filed 7 Jun. 2013 as "Injection Molded Diaphragm Pump for Liquid Color with Quick Release", published 19 Dec. 2013 as U.S. 2013/0334258 A1, incorporating a quarter turn adapter outlet fitting in accordance with this invention.

Referring to the drawings and particularly FIG. 7, a liquid color pump 14 is mounted on a liquid color drum or pail lid 16, and sits essentially flush with the lid forming the top of the drum. When pump 14 and the associated drum are placed in service, an actuator designated generally 22 is connected to pump 14. One suitable actuator 22 is disclosed in co-pending U.S. patent application Ser. No. 14/168,731.

Figure 1:
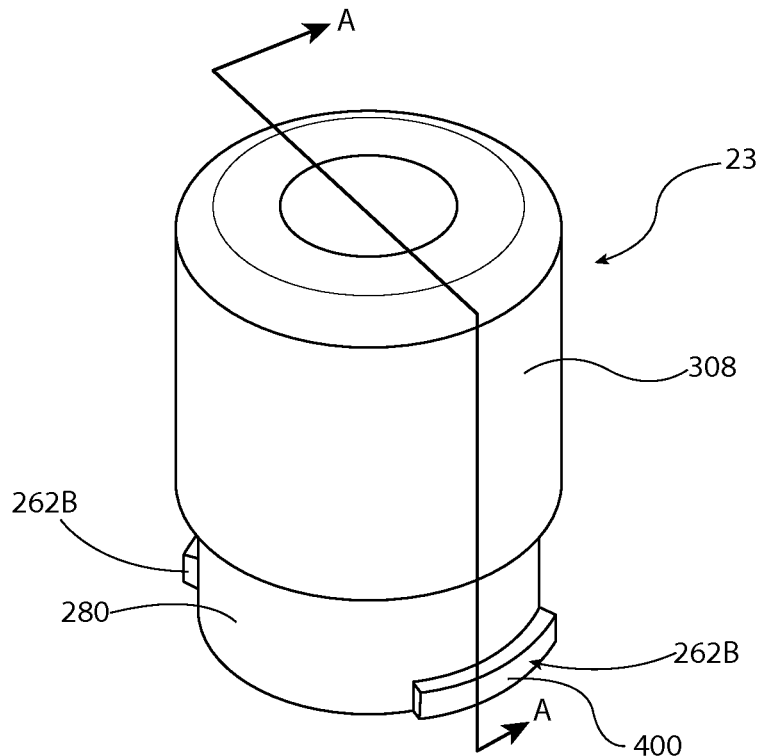
FIG. 1 is an isometric view of a quarter turn adapter connector fitting manifesting aspects on the invention.
Figure 2:
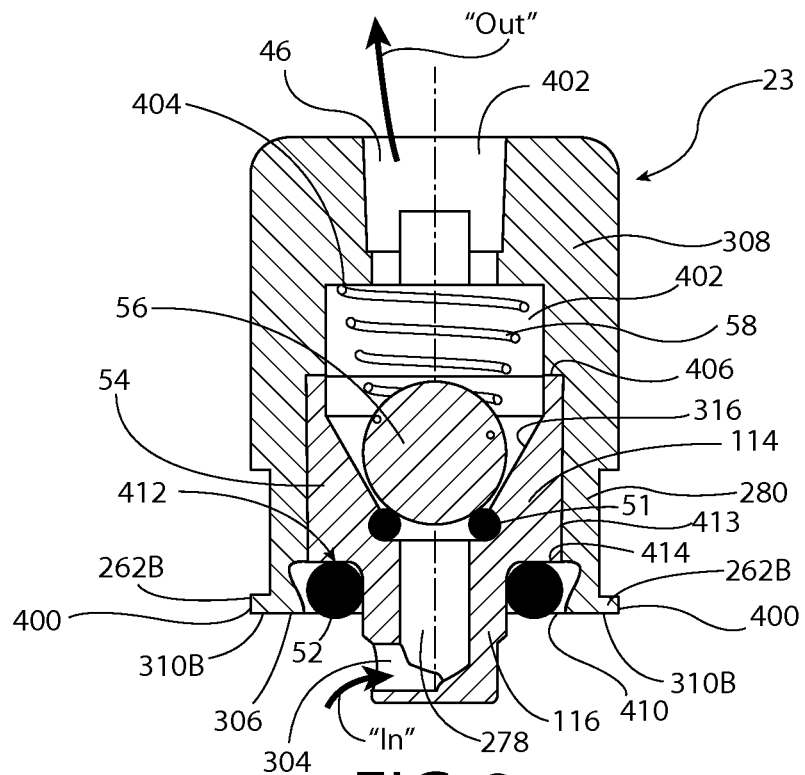
FIG. 2 is a sectional view of the quarter turn adapter connector fitting taken at lines and arrows A-A in FIG. 1.
Figure 3:
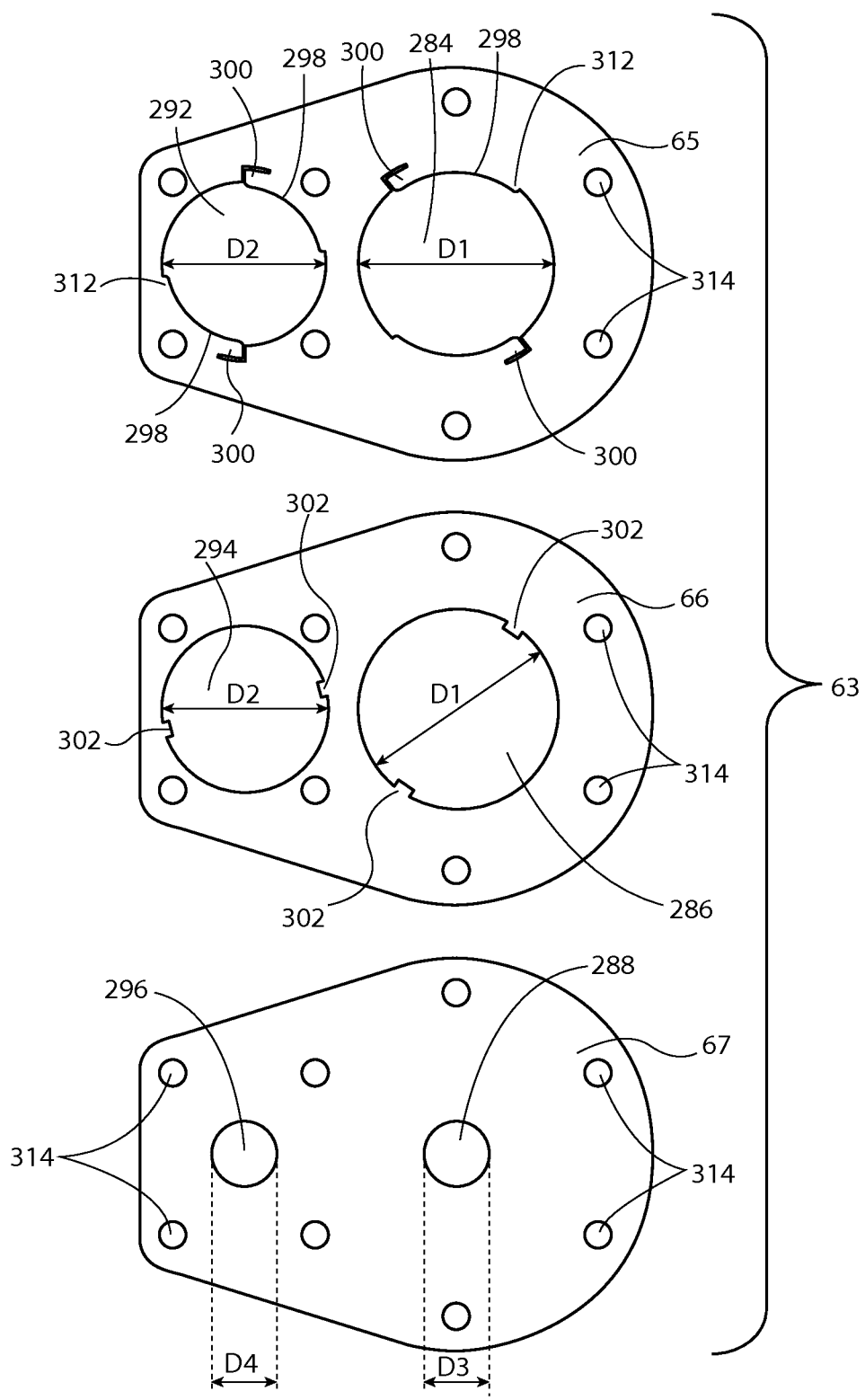
FIG. 3 is a top view of a retainer plate, a spacer plate, and a base plate portions of a quick disconnect fitting of the sandwich type, as disclosed and claimed in co-pending application Ser. No. 14/587,921 filed 31 Dec. 2014 as "Multiple Plate Quick Disconnect Fitting."

A quarter turn adapter outlet assembly 23 is illustrated in FIGS. 1 and 2 and is adapted to matingly connect with a quick-disconnect assembly, preferably of the sandwich type disclosed in co-pending application Ser. No. 14/587,921 and as disclosed hereinbelow. When so-connected, quarter turn adapter outlet assembly connects the output port of pump 14 to a delivery line or other receptacle or receiver for the liquid color coming from pump 14. One end of such a delivery line fits into an upper recess 46, which defines a liquid color conduit outlet, of quarter turn adapter outlet assembly. The other end of such a delivery line (the delivery line is not shown in the drawing as fitting into the upper recess 46 of quarter turn adapter 23) desirably connects to a process machine, namely either an injection molding machine or an extruder or perhaps to a gravimetric blender. Upper recess 46 may be equipped with internal threads or otherwise modified from the straight-line tubular form illustrated in FIG. 2 so as to provide connection for a delivery line to fit tightly into or with quarter turn adapter 23 to receive liquid color coming through quarter turn adapter 23 and out of upper recess 46.

A second adapter, namely inlet assembly 22, which also includes a quick-disconnect connection, connects an air supply to pump 14. Inlet assembly 22 has specific applicably to liquid color diaphragm pumps; inlet assembly 22 may also be used with piston-type pumps.

The first and second adapters, namely quarter turn adapter outlet assembly 23 and inlet assembly 22, are removable from pump 14.

FIGS. 1 and 2 illustrate an embodiment of the quarter turn adapter outlet assembly 23. The outlet assembly 23 includes, generally, an outer portion 308 and an inner portion 114. Outer portion 308 has pumped liquid color outlet aperture 46 defining one end of an axial passageway 402 extending through outer portion 308. Inner portion 114 includes an interior tubular passageway 278. Lugs 262B extend radially from an annular exterior recess surface 280 of outer portion 308 and have outwardly facing curved annular surfaces 400, one of which is shown in FIG. 1, and which exhibit the same curvature as annular exterior surface 280 of outer portion 308. Preferably, the lower surfaces 310B of lugs 262B are coplanar with a lower planar surface 306 of outer portion 308 of quarter turn adapter outlet assembly 23.

Quarter turn adapter outlet assembly 23 includes as a part of inner portion 114 a liquid color outlet shutoff valve designated generally 54, a liquid color outlet shutoff valve ball 56, a first o-ring 51 and a liquid color outlet shutoff valve spring 58. Outlet shutoff valve 54 has a seat 316, formed as an upwardly facing conical surface of inner portion 114.

Inner portion 114 is preferably press-fit into a hollow interior of outer portion 308 of the quarter turn adapter outlet assembly 23. Inner portion 114 includes a lower annular protrusion 116 extending beyond the lower planar surface 306 of outer portion 308 and below annular exterior recessed surface 280 of outer portion 308 of quarter turn adapter outlet assembly 23.

Passageway 278 extends axially part way down the axial length of inner portion 114, from the surface defining valve seat 116. However, passageway 278 does not exit inner portion 114 axially, but turns and extends laterally, having a lateral opening 304 formed in lower annular extension 116, for intake of pumped liquid color thereinto.

The connection resulting from use of quarter turn adapter outlet assembly 23 is preferably air tight. Accordingly, it is preferable that a second o-ring 52 is provided with the quarter turn adapter outlet assembly so that in combination with lugs 262B and the multiple plate quick disconnect sandwich fitting described below, quarter turn adapter outlet assembly 23, upon a quarter turn, is in tight facing connection with the frame or mouth portion of an associated structure such that an air tight seal is created between the lower surface 310B of lugs 262B and the lower surface 306 of outer portion 308 of the quarter turn adapter outlet assembly 23, and the frame or mouth of the associated structure.

Still referring principally to FIG. 1 and to FIG. 2, outer portion 308 is of generally cylindrical configuration with outwardly extending arcuate lugs 262B formed on a first end of generally cylindrical outer portion 308. The "first end" for purposes of this description is the lower end of quarter turn adapter outlet fitting 23 illustrated in FIGS. 1 and 2.

Lower surfaces 310B of lugs 262B are coplanar with lower surface 306 of generally cylindrical outer portion 308; lower surface 306 is a planar surface. Outwardly facing surfaces 400 of lugs 262 are curved and parallel with the curved cylindrical outer surface of outer portion 308 as illustrated in FIG. 1. Lugs 262B most preferably subtend angles of less than 90°; however lugs 262B may subtend angles from as small as 20° to as great as 150°, depending upon the geometry of the fitting with which lugs 262B matingly engage.

A first axially oriented passageway 402 extends through outer portion 308. First and second annular internal shoulders 404, 406 are formed in first axial passageway 402 and are positioned intermediate the first and second ends of outer portion 308.

Second annular internal shoulder 406 defines an end of a central cylindrical portion 408 of first axial passageway 402 when inner portion 114 is positioned within outer portion 308 as illustrated in FIG. 2 with an upper extremity of inner portion 114 abutting second annular shoulder 406. Second annular internal shoulder 406 is of smaller diameter than first annular internal shoulder 404. Additionally, second annular internal shoulder 406 is more proximate to first end of outer portion 308 than is first annular internal shoulder 404.

First axial passageway 402 in outer portion 308 houses inner portion 114 as illustrated in FIG. 2 and includes an undercut annular recess 410 located at the first end of cylindrical outer portion 308.

Inner portion 114 has a cylindrical outer surface 413 extending axially lengthwise partway along the length of inner portion 114; cylindrical outer surface 413 of inner portion 114 is in tight fitting facing complemental contact with a corresponding interior cylindrical surface of outer portion 308. An annular protrusion 116 extends from the end of the inner portion annular outer surface 412 to define a first end of inner portion 114. Annular protrusion 116 has a greater diameter at the position of juncture with inner portion lower annular outer surface 412 and a lesser diameter remote from juncture with inner portion lower annular outer surface 412. The juncture defines a perpendicular shoulder 414 relative to inner portion cylindrical outer surface 413. Annular protrusion 116 defines a first end of inner portion 114. Annular protrusion 116 has a greater diameter at juncture with inner portion lower annular outer surface 412 and a lesser diameter remote from juncture with inner portion lower annular outer surface 412. The juncture defines a perpendicular shoulder 414 relative to the inner portion cylindrical outer surface 413.

Axial passageway 278 extends from the first end of inner portion 114 towards the second end. Axial passageway 278 has a lateral opening 304 in the lesser diameter portion of annular protrusion 116 proximate the first end of inner portion 114.

Note that when assembled with a pump, such as pump 14 shown in FIG. 7, quarter turn adapter 23 is desirably rotated 180° from the position illustrated in FIG. 2 to the position illustrated in FIG. 7, at which lateral opening 304 in protrusion 116 (neither of which are numbered in FIG. 7) faces to the right in FIG. 7. This facilitates receipt of liquid color pumped by pump 14 as the liquid color flows from a pumping section of pump 14 through a channel, defined by a recess formed in the upper surface of the molded one-piece pump lower body portion, to an outlet section of the pump, which is defined generally by the structure underlying quarter turn adapter outlet assembly 23, and into lateral opening 304 in protrusion 116 for liquid color flow upwardly through quarter turn adapter outlet assembly 23.

During operation, liquid color pumped by a pump, such as the pump illustrated in FIG. 7, enters passageway 278 as indicated by the arrow labeled "In" in FIG. 2. If pump pressure is substantial enough, liquid color pushes against ball 56, lifting ball 56 from seat 316 against the downward force exerted by spring 58 on ball 56. As the liquid color raises ball 56, ball 56 loses contact with first o-ring 53. This results in liquid color flowing, as pumped by pump 14, upwardly through interior passageway 278 of inner portion 114, through interior passageway 402 of outer portion 308, and out of outlet 46 as indicated by the arrow "Out" in FIG. 2.

Spring 404 may be selected to provide a desired level of resistance to opening of valve 54 such that the pressure of liquid color entering at the "In" arrow, into passageway 278 via lateral opening 304 may be regulated according to design parameters and desires. Similarly, the dimensions of ball 56 and passageways 278, 402 may be varied along with the spring constant of spring 404 to require greater or less pressure of the liquid color as it is pumped for the liquid color to flow through quarter turn adapter outlet assembly 23.

With reference to FIGS. 3 through 6, a multiple plate quick disconnect sandwich 63 includes a retainer plate 65, a spacer plate 66, and a base plate 67. Each of plates 65, 66, 67 desirably includes generally circular openings that correspond to generally cylindrical connections of a pump inlet assembly and a pump outlet assembly or to conduits that are to be connected together, and/or to protrusion 116 of inner portion 114 of quarter turn adapter outlet assembly 23.

Retainer plate 65 includes a larger generally circular passageway 284 and a smaller generally circular passageway 292; spacer plate 66 includes a larger circular passageway 286 and a smaller circular passageway 294; base plate 67 includes a larger circular passageway 288 and a smaller circular passageway 296.

Figure 5:
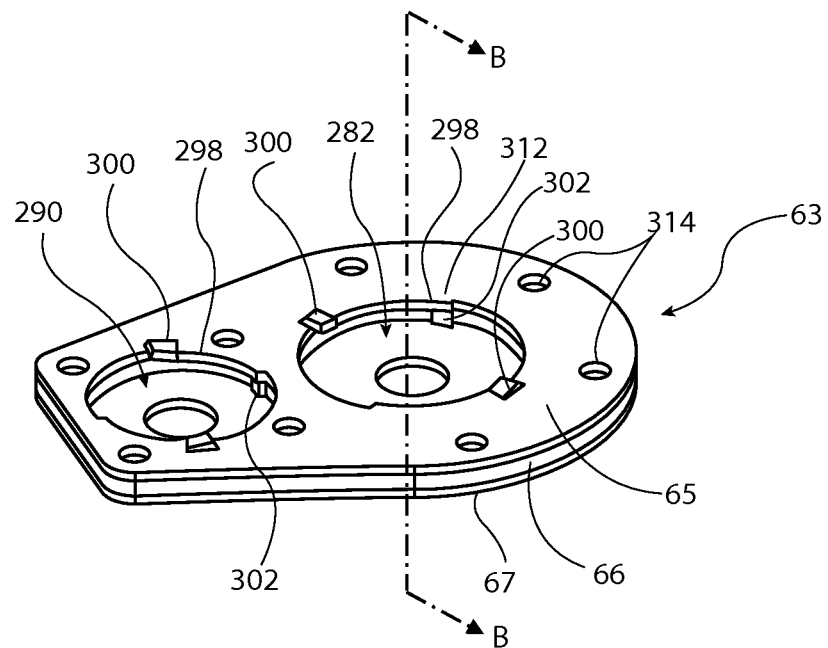
FIG. 5 is an isometric view of the multiple plate quick disconnect sandwich, illustrated in FIGS. 3 and 4 in assembled form as disclosed and claimed in co-pending application Ser. No. 14/587,921 filed 31 Dec. 2014 as "Multiple Plate Quick Disconnect Fitting."
Figure 6:
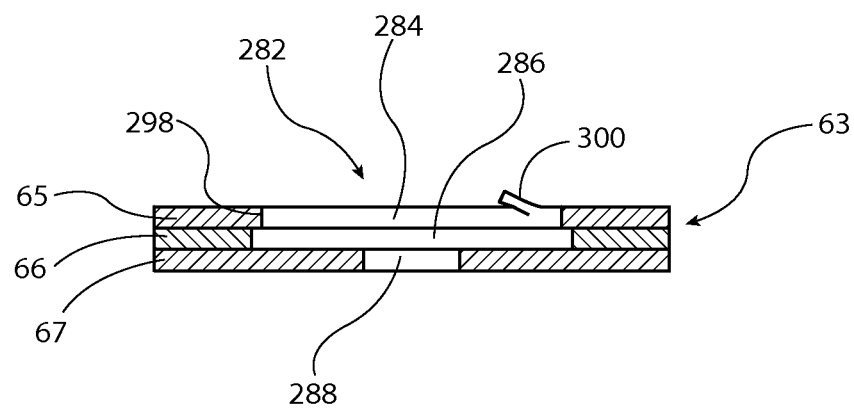
FIG. 6 is a sectional view of the assembled multiple plate quick disconnect sandwich taken at lines and arrows B-B in FIG. 5 as disclosed and claimed in co-pending application Ser. No. 14/587,921 filed 31 Dec. 2014 as "Multiple Plate Quick Disconnect Fitting."

As shown in FIGS. 5 and 6, respective plates 65, 66, 67 are desirably placed on one another in facing disposition to create the multiple plate quick disconnect sandwich 63. In this configuration, the respective associated larger and smaller passageways in each plate collectively define what may be either an inlet or an outlet passageway 282 and what may be either an inlet or outlet passageway 290. Most desirably the smaller passageways in each plate are sized to accept and to mate with quarter turn adapter outlet assembly 23 or a similar structure. The respective generally circular, and circular, larger passageways 284, 286 respectively of retainer plate 65 and spacer plate 66 are preferably formed on a radius such that they have essentially the same diameters D1 and their respective smaller generally circular, and circular, passageways 292, 294 respectively have essentially the same diameters D2. Of course the diameters of the passageways of the retainer plate 65 in the area of their retaining guides differ, as discussed below.

Larger circular passageway 288 and smaller circular passageway 296 of base plate 67 are each preferably formed with smaller radii than that of associated larger arcuate passageways 284, 286 and associated smaller arcuate passageways 292, 294, and have diameters D3 and D4, respectively.

Diameters D1, D2, D3, and D4 are determined by the dimensions of the inlets and outlets being connected.

Diameter D1 is preferably substantially equivalent to the diameter of an associated assembly, for example, from the outer edge of one lug to the outer edge of an opposing lug, for example again, such as lug 262B. Similarly, diameter D2 is preferably substantially equivalent to the cross-sectional width of an associated assembly from the outer edge of one lug to the outer edge of an opposing lug, such as lug 262B. Diameter D3 and diameter D4 are chosen according to the inlets and outlets being connected using the multiple plate quick disconnect sandwich.

Retainer plate 65 preferably includes pairs of arcuate retaining guides 298, 298A with the guides extending slightly into retainer plate generally circular passageway 284 and into the retainer plate generally circular passageway 292 on opposite sides thereof to form regions of reduced diameter in passageway 282 and in passageway 290. Retaining guides 298, 298A preferably have an arc length of 80°, but it should be understood that the arc length of retaining guides 298, 298A may range from about as little as 30° to as much as 150°.

Figure 4:
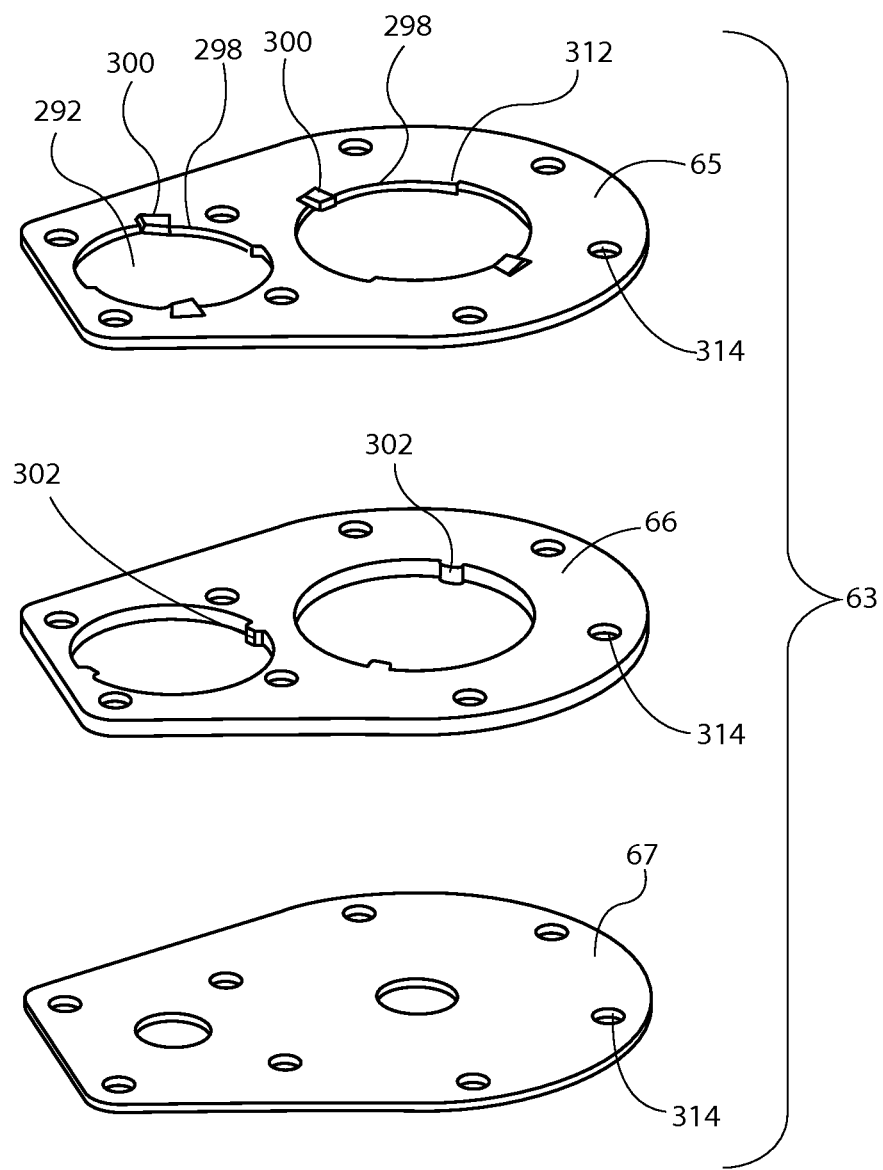
FIG. 4 is an exploded isometric schematic view of a multiple plate quick disconnect fitting of the type illustrated in FIG. 3 showing, from top to bottom, a retainer plate, a spacer plate, and a base plate as disclosed and claimed in co-pending application Ser. No. 14/587,921 filed 31 Dec. 2014 as "Multiple Plate Quick Disconnect Fitting."

As illustrated in FIGS. 4, 5, and 6, each retaining guide 298, 298A extends angularly from an upwardly sloped leading tab 300 to a trailing edge 312, with leading tab 300 and trailing edge 312 defining the angular extremities of arcuate retaining guides 298, 298A. Each sloped leading tab 300 is angled upwardly, away from spacer plate 66, preferably about ten degrees with respect to the planar surface of retainer plate 65, which is opposite from the surface of retainer plate 65 that facingly contacts spacer plate 66.

As illustrated in FIGS. 4 and 5, spacer plate 66 includes preferably generally rectangular stops 302 extending from the inner periphery of the circular passageways 286, 294 of spacer plate 66. As shown in FIG. 6, when plates 65, 66, 67 are placed on each other to form the quick disconnect sandwich 63, stops 302 are preferably both axially and angularly aligned with trailing edges 312 of guides 298, 298A of retainer plate 65.

Each plate 65, 66, 67 of quick disconnect sandwich 63 includes openings 314 that align with the with openings in a structure, such as the liquid color pump illustrated in FIG. 7, to allow for mounting quick disconnect sandwich 63 to a structure such as liquid color pump 14 illustrated in FIG. 7, to which rapid connection/disconnection of quarter turn adapter outlet assembly 23 is desired. Nut and bolt combinations are preferably used for this where the nut and bolt combination are designated 88 in FIG. 7, with the nuts designated 90 and the bolts designed 92. The heads of bolts 92 are not depicted, to enhance drawing clarity.

As respecting operation, after quick disconnect sandwich 63 is assembled as shown in FIGS. 5 and 6, and is attached to a structure such as liquid color pump 14 illustrated in FIG. 7, the quarter turn adapter outlet assembly 23 to be quickly connected/disconnected may be centered over the generally circular passageway 290 of quick disconnect plate assembly 63 in a position such that the lower annular protrusion 116 of quarter turn adapter outlet assembly 23 extends through generally circular passageway 296 of the quick disconnect base plate 67 and lugs 262B are adjacent the sloped leadings tabs 300 of the retaining guides 298 while a lower planar surface 306 of lugs 262B rests on the upper surface of the quick disconnect retainer plate 65.

As quarter turn adapter outlet assembly 23 is rotated, lugs 262B slip under sloped leading tabs 300 and then continue to moveably slide under the remainder of retaining guide 298 along the surface of quick disconnect base plate 67 until lugs 262B abut stops 302 on quick disconnect spacer plate 66. Due to the upwardly angular configuration of sloped leading tabs 300, quarter turn adapter outlet assembly 23 is increasingly pressed against the outwardly facing surface of quick disconnect base plate 67 as quarter turn adapter outlet assembly 23 is rotated into place. The overhang of retaining guides 298 in retainer plate 65 over corresponding space in space plate 66, which is occupied by lugs 262B, with guides 298 contacting upper surfaces of lugs 262B as lugs 262B rest on and facingly contact spacer late 66, prevents displacement of lugs 262B in the vertical direction thereby retaining quarter turn adapter outlet assembly in place.

Most desirably the underside of each retaining guide 298, 298A and/or the corresponding underlying surfaces of retainer plate 66 lying under retaining guides 298, 298A and which lugs 262B facingly contact when quarter turn adapter outlet assembly is matingly engaged with quick disconnect sandwich 63, are desirably contoured or machined so that the space, between the underside of each retaining guide 298, 298A and the corresponding underlying surfaces of spacer plate 66, diminishes as one proceeds from the leading tabs 300 to the trailing edges 312 and the rectangular stops 302. This diminishing space, amounting to a taper, assures that quarter turn outlet assembly 23 will be securely and liquid color tightly engaged with quick disconnect sandwich 63 when lugs 262B are inserted under retaining guides 298, 298A at tabs 300 and quarter turn adapter assembly 23 is manually rotated in the neighborhood of 90° degrees.

Because stops 302 are preferably located nearly or directly below trailing edge 312 of retaining guide 298, quarter turn adapter outlet assembly 23 only requires a manually applied quarter turn to transition from an unlocked position, in which lugs 262B are located outside leading tabs 300 of retaining guide 298, to a locked position, in which lugs 262B are adjacent stops 302. To disconnect, the quarter turn adapter outlet assembly 23 is manually rotated a quarter turn in the opposite direction such that lugs 262B slide out from under leading tabs 300 of guides 298.

While assembly 23 has been characterized herein as a "quarter turn" outlet assembly, it is to be understood that the sizes of lugs 262B and the corresponding quick release structure with which quarter turn outlet assembly mates, such as the multiple plate disconnect sandwich 63 illustrated in FIGS. 3 through 6, can be selected so that less than a quarter turn is required or that more than a quarter turn is required to engage and disengage outlet assembly 23 from the structure with which it matingly connects and disconnects. However, a quarter turn is desirable since it facilitates manual connection and disconnection of assembly 23 with such manual connection and disconnection being performed facilely and quickly. This allows quick changeover from one outlet assembly 23 to another, thereby facilitating change of the spring constant, and/or a switch to a different or alternate geometry of the through passageway and hence the pressure at which liquid color will be discharged from outlet 46, and allows regulation of the amount of liquid color discharged by outlet assembly 23 through pumped liquid color outlet 46. This also facilitates changeover from one color liquid to another.

The invention claimed is:

1. A fitting for delivery of liquid color in one direction only therethrough, comprising:
   a. an undercut-shaped annular recess defining an inset pocket at a first end of the fitting for receiving an external O-ring therein for sealing the fitting against a liquid color source upon a manually applied quarter turn of the fitting;
   b. a cylindrical housing having a passageway therethrough;
   c. a check valve residing in the passageway;
   d. a lug extending laterally from the housing for engaging with and disengaging from a receptacle upon a manually applied turn of the fitting, having a lower surface that is co-planar with an end surface of the cylindrical housing; wherein an outwardly facing surface of the lug is curved and parallel with a curved side of the cylindrical housing.

2. The fitting of claim 1 wherein the housing has inner and outer portions that facingly contact one another, with the passageway passing through the inner and outer portions and being axial respecting the cylindrical housing within the outer portion.

3. The fitting of claim 2 wherein there are a plurality of lugs.

4. The fitting of claim 3 wherein the lugs subtend angles of between 30 and 150 degrees.

5. The fitting of claim 4 wherein the lugs have rectangular cross sections.

6. The fitting of claim 4 wherein the lugs have square cross sections.

7. A fitting for delivery of liquid color in one direction only therethrough, comprising:
   a. a cylindrical housing having a passageway therethrough;
   b. a check valve residing in the passageway;
   c. a lug extending laterally from the housing for engaging with and disengaging from a receptacle upon a manually applied turn of the fitting, having a lower surface that is co-planar with an end surface of the cylindrical housing; wherein an outwardly facing surface of the lug is curved and parallel with a curved side of the cylindrical housing.

8. A quarter turn adapter outlet fitting for controlled delivery of liquid color therethrough from a supply, comprising:
   a. an generally cylindrical outer portion, having
      i. a pair of outwardly extending arcuate lugs formed on a first end thereof, lower surfaces of the lugs being co-planar with a first end surface of the outer portion, outwardly facing surfaces of the lugs being curved and parallel with a curved cylindrical outer surface of the outer portion, the lugs subtending angles of less than 90 degrees;
      ii. a first axial passageway extending through the outer portion, the first axial passageway having first and second annular internal shoulders formed therein intermediate first and second ends of the outer portion, the second shoulder defining an end of a central cylindrical portion of the first axial passageway, the second shoulder being of larger diameter than the first shoulder and being more proximate the first end of the outer portion; the first axial passageway having an undercut-shaped annular recess at the first end of the cylindrical outer portion;
   b. an inner portion having
      i. a cylindrical outer surface extending axially lengthwise partway along the length of the inner portion;
      ii. an annular protrusion extending from terminus of the inner portion cylindrical outer surface to define a first end of the inner portion, the annular protrusion having a greater diameter at a juncture with the inner portion cylindrical outer surface and a lesser diameter remote from the juncture with the inner portion cylindrical outer surface, the juncture defining a perpendicular shoulder relative to the inner portion cylindrical outer surface;
      iii. a second axial passageway extending from the first end towards the second end, the second axial passageway having an lateral opening in the lesser diameter portion of the annular protrusion proximate the first end of the inner portion, the second axial passageway having a conical surface between the first end and a second end to define a valve seat;

c. a first o-ring within the inner portion, positioned at a juncture of a minimum diameter part of the conical surface and a tubular part of the second axial passageway;
d. a ball residing on the conical surface and contacting the first o-ring;
e. a spring between the ball and the first annular internal shoulder, for biasing the ball against the first o-ring;
f. the cylindrical outer surface of the inner portion being in facing complemental contact with the central cylindrical portion of the first axial passageway, a first end of the inner portion abutting the second shoulder of the first axial passageway, the undercut-shaped annular recess in the outer portion and the perpendicular shoulder of the annular protrusion of the inner portion forming an inset pocket at the first end of the fitting for receiving an o-ring therein for sealing the fitting against the supply, the first and second axial passageways being coaxial and communicating with one another.

* * * * *